(12) United States Patent
Turner

(10) Patent No.: US 11,254,453 B2
(45) Date of Patent: Feb. 22, 2022

(54) SMALLSAT PAYLOAD CONFIGURATION

(71) Applicant: Space Systems/Loral, LLC, Palo Alto, CA (US)

(72) Inventor: Andrew E. Turner, Mountain View, CA (US)

(73) Assignee: Space Systems/Loral, LLC, Palo Alto, CA (US)

(*) Notice: Subject to any disclaimer, the term of this patent is extended or adjusted under 35 U.S.C. 154(b) by 18 days.

(21) Appl. No.: 16/748,617

(22) Filed: Jan. 21, 2020

(65) Prior Publication Data
US 2021/0122501 A1 Apr. 29, 2021

Related U.S. Application Data

(63) Continuation-in-part of application No. 15/351,233, filed on Nov. 14, 2016, now Pat. No. 10,538,347.

(51) Int. Cl.
*B64G 1/64* (2006.01)
*B64G 1/00* (2006.01)
(Continued)

(52) U.S. Cl.
CPC ............. *B64G 1/641* (2013.01); *B64G 1/007* (2013.01); *B64G 1/1085* (2013.01); *B64G 1/222* (2013.01); *B64G 2001/643* (2013.01)

(58) Field of Classification Search
CPC .......... B64G 1/007; B64G 1/085; B64G 1/10; B64G 1/222; B64G 1/641; B64G 2001/643
(Continued)

(56) References Cited

U.S. PATENT DOCUMENTS 3,380,687 A 4/1968 Ford
4,667,908 A 5/1987 Hayden et al.
(Continued)

FOREIGN PATENT DOCUMENTS

JP 2011 251560 A 12/2015
RU 2 111 901 C1 8/1996

OTHER PUBLICATIONS

Toorian et al., "Cubesats as responsive satellites," AIAA-RS3 2005-3001, 3rd Responsive Space Conference 2005, 9 pages.
(Continued)

*Primary Examiner* — Brady W Frazier
(74) *Attorney, Agent, or Firm* — Weaver Austin Villeneuve & Sampson LLP

(57) ABSTRACT

Techniques for deploying a plurality of smallsats from a common launch vehicle are disclosed where a structural arrangement provides a load path between an upper stage of the launch and the plurality of spacecraft. Each spacecraft is mechanically coupled with the launch vehicle upper stage only by the structural arrangement. The structural arrangement includes at least one trunk member that is approximately aligned with the longitudinal axis of the launch vehicle upper stage, a plurality of branch members, each branch member being attached to the trunk member and having at least a first end portion that is substantially outboard from the longitudinal axis; and a plurality of mechanical linkages, each linkage coupled at a first end with a first respective spacecraft and coupled at a second end with one of the plurality of branch members, the trunk member or a second respective spacecraft.

18 Claims, 11 Drawing Sheets

(51) Int. Cl.
*B64G 1/22* (2006.01)
*B64G 1/10* (2006.01)

(58) Field of Classification Search
USPC ...................................................... 244/158.5
See application file for complete search history.

(56) References Cited

U.S. PATENT DOCUMENTS

| | | | |
|---|---|---|---|
| 4,688,486 A | 8/1987 | Hall et al. | |
| 4,964,596 A | 10/1990 | Ganssle et al. | |
| 5,052,640 A | 10/1991 | Chang | |
| 5,145,130 A | 9/1992 | Purves | |
| 5,199,672 A | 4/1993 | King et al. | |
| 5,605,308 A | 2/1997 | Quan et al. | |
| 5,613,653 A | 3/1997 | Bombled et al. | |
| 6,138,951 A | 10/2000 | Burdis et al. | |
| 6,279,482 B1 | 8/2001 | Smith et al. | |
| 6,296,206 B1 | 10/2001 | Chamness et al. | |
| 7,114,682 B1 | 10/2006 | Kistler et al. | |
| 7,578,482 B2 | 8/2009 | Duden | |
| 8,608,114 B2* | 12/2013 | Smith ................... | B64G 1/641 244/173.3 |
| 9,027,889 B2* | 5/2015 | Aston .................. | B64G 1/1085 244/173.1 |
| 9,242,743 B2 | 1/2016 | Chu | |
| 9,434,485 B1 | 9/2016 | Lehocki | |
| 9,463,882 B1* | 10/2016 | Field ..................... | B64G 1/645 |
| 9,718,566 B2 | 8/2017 | Field et al. | |
| 9,720,414 B1 | 8/2017 | Theobald | |
| 9,878,806 B2 | 1/2018 | Helmer et al. | |
| 10,538,347 B1 | 1/2020 | Turner et al. | |
| 2002/0000495 A1 | 1/2002 | Diverde et al. | |
| 2002/0179776 A1 | 12/2002 | Mueller et al. | |
| 2005/0230557 A1 | 10/2005 | Aghili | |
| 2012/0080563 A1 | 4/2012 | Gryniewski et al. | |
| 2013/0011189 A1 | 1/2013 | Kamiya et al. | |
| 2013/0154170 A1* | 6/2013 | Davis .................... | B64G 1/641 267/136 |
| 2015/0336686 A1* | 11/2015 | Nijenhuis ............ | F16M 11/121 410/117 |
| 2016/0264264 A1 | 9/2016 | Helmer et al. | |
| 2016/0304222 A1 | 10/2016 | Fernandez et al. | |
| 2016/0368625 A1 | 12/2016 | Field et al. | |
| 2018/0170586 A1 | 6/2018 | Riskas | |

OTHER PUBLICATIONS

U.S. Notice of Allowance dated Sep. 12, 2019 issued in Application No. 15/351,233.
U.S. Final Office Action dated Jul. 9, 2019 issued in U.S. Appl. No. 15/351,233.
U.S. Office Action dated Nov. 15, 2018 issued in U.S. Appl. No. 15/351,233.
Extended European Search Report in EP Application No. 21152414.5.

* cited by examiner

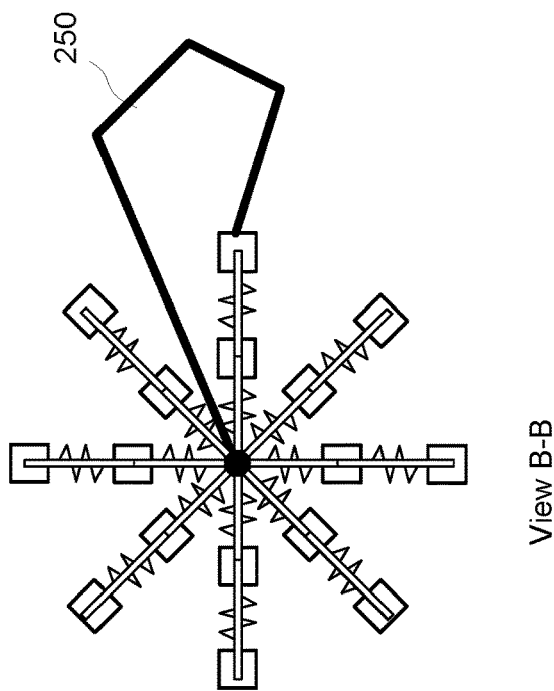
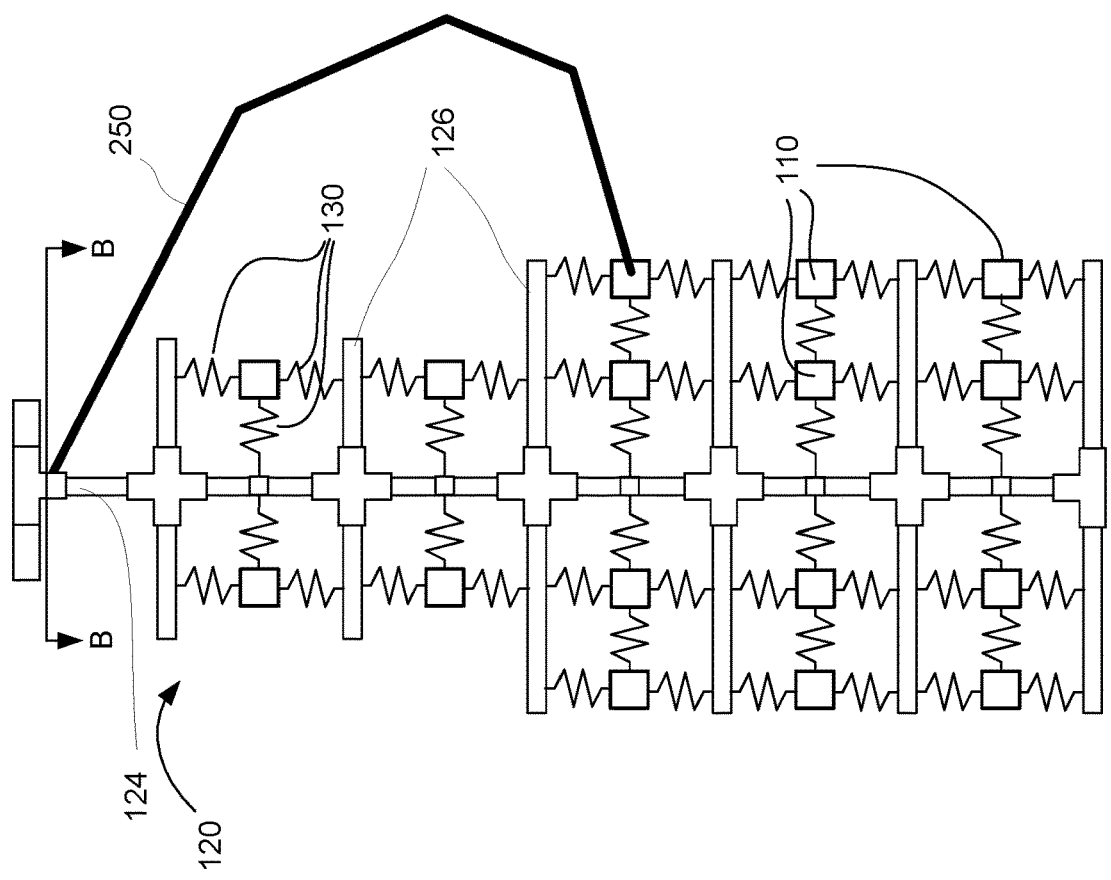
Figure 2

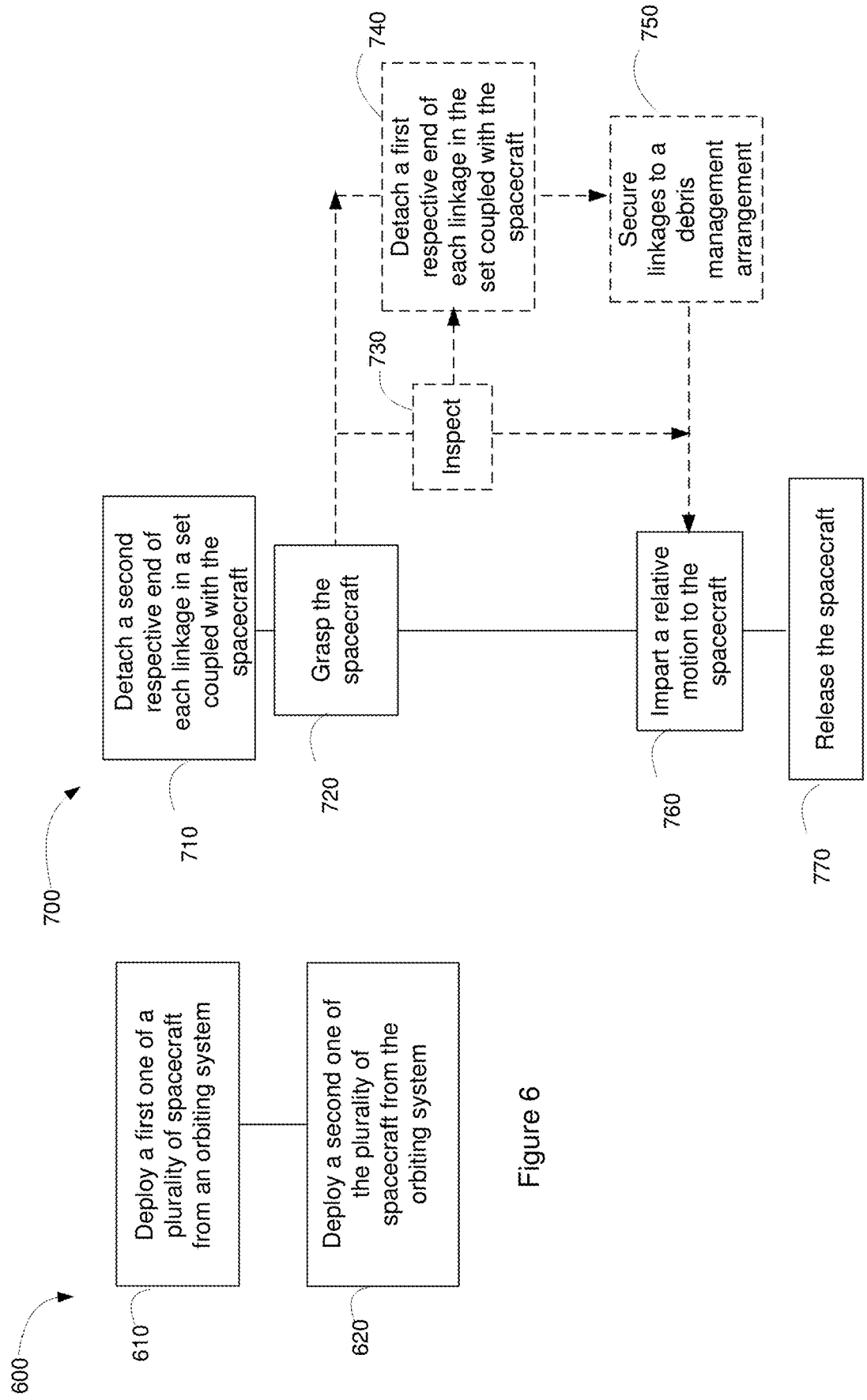

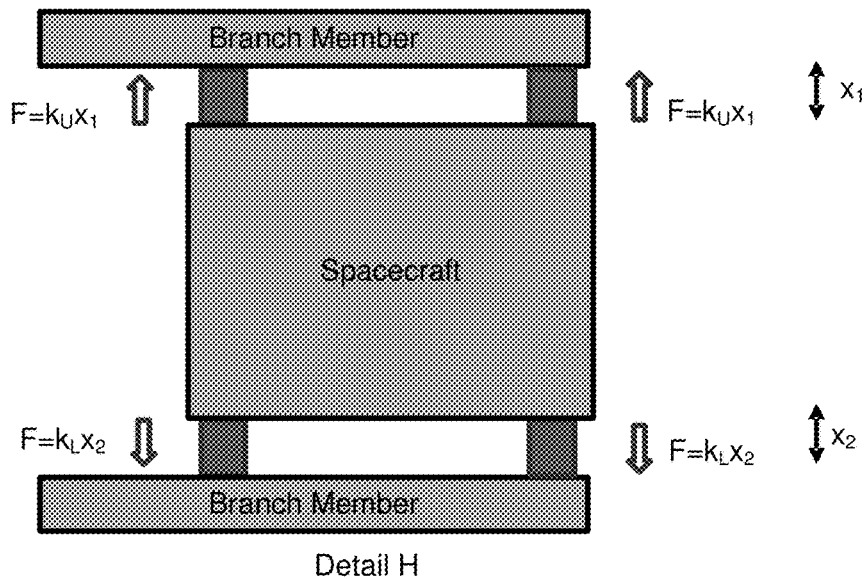
Detail H
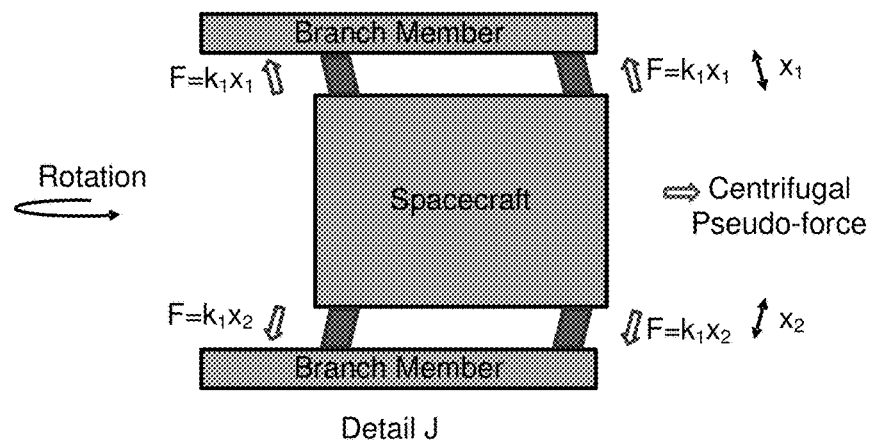
Detail J
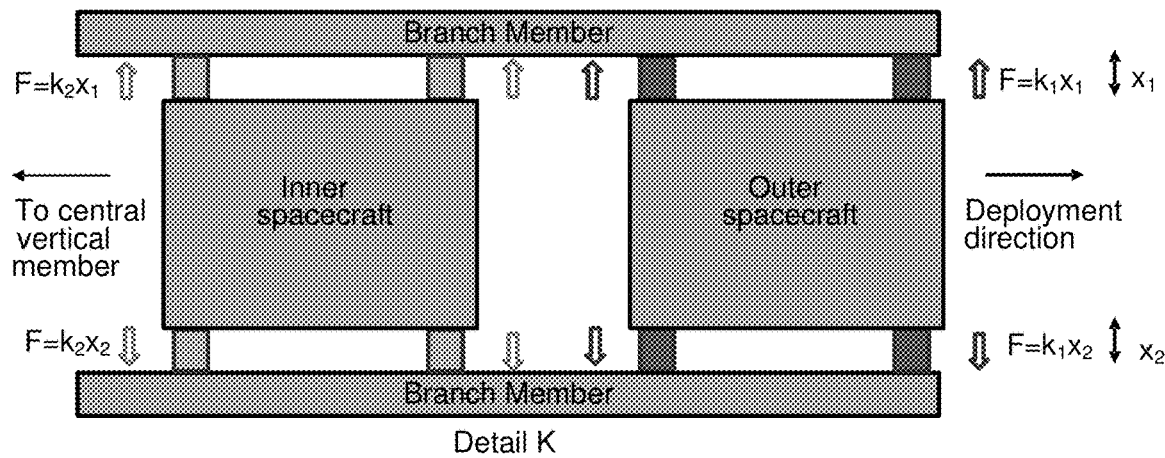
Detail K
Figure 10

SMALLSAT PAYLOAD CONFIGURATION

PRIORITY DATA

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

This invention relates generally to a launch vehicle payload where the payload includes a large number of very small spacecraft, and more particularly to techniques for structurally supporting the spacecraft during launch and deploying the spacecraft following launch.

BACKGROUND

Conventionally, smallsats such as microsats (10-100 kg mass), nanosats (1-10 kg mass) and picosats (0.1-1 kg mass) are launched only in small quantities on shared launches with larger spacecraft or on relatively small launch vehicles. Satellite operators, however, are now contemplating large constellations of nanosats or picosats, for example, the constellations including as many as thousands or even tens of thousands of spacecraft. The presently disclosed techniques enable tens to thousands of smallsats to be simultaneously carried into space on a single launch vehicle, and subsequently deployed into orbit.

SUMMARY

The presently disclosed techniques relate to a launch vehicle payload system that includes a number of small spacecraft and to techniques for structurally supporting the spacecraft during launch and deploying the spacecraft following launch.

According to some implementations, the system includes a payload including a plurality of spacecraft and a structural arrangement providing a load path between a launch vehicle upper stage and the plurality of spacecraft. Each spacecraft is mechanically coupled with the launch vehicle upper stage only by the structural arrangement. The structural arrangement includes: at least one trunk member that is approximately aligned with a longitudinal axis of the launch vehicle upper stage and a plurality of branch members, each branch member being attached to the trunk member and having at least a first end portion that is substantially outboard from the longitudinal axis, and a plurality of mechanical linkages, each linkage coupled at a first end with a first respective spacecraft and coupled at a second end with one of the plurality of branch members, the trunk member or a second respective spacecraft.

In some examples, at least one of the plurality of mechanical linkages may include a first respective end coupled to the first respective spacecraft and a second respective end attached to the second respective spacecraft.

In some examples, at least one spacecraft of the plurality of spacecraft is attached to a respective subset of the plurality of mechanical linkages; and no mechanical linkage in the respective subset is attached to the trunk member.

In some examples, each of the mechanical linkages may include a spring-like coupling that provides substantial resistance to both compression and tension.

In some examples, one or more branch members may have a second end portion attached to the trunk member.

In some examples, one or more branch members may be attached to the trunk at a central portion and may have a second end portion that is substantially outboard from the longitudinal axis.

In some examples, the system may include at least one robotic manipulator. In some examples, the at least one robotic manipulator may be configured to detach at least one of the plurality of spacecraft from the structural arrangement, and deploy the spacecraft by imparting a delta V to the spacecraft. In some examples, the system may include a sensor and the at least one robotic manipulator may be configured to position the at least one spacecraft proximate to the sensor such that a physical inspection may be performed using the sensor. In some examples, the system may include a debris management arrangement and the robotic manipulator may be configured to detach one or more of the mechanical linkages and secure the detached mechanical linkages to the debris management arrangement.

According to some implementations, a method includes deploying, from an orbiting system including a plurality of spacecraft, a first spacecraft of the plurality of spacecraft and deploying, from the orbiting system, a second spacecraft of the plurality of spacecraft. A structural arrangement provides a load path between a launch vehicle upper stage and the plurality of spacecraft. Each spacecraft is mechanically coupled with the launch vehicle upper stage only by the structural arrangement. The structural arrangement includes at least one trunk member that is approximately aligned with a longitudinal axis of the launch vehicle upper stage, a plurality of branch members, each branch member being attached to the trunk member and having at least a first end portion that is substantially outboard from the longitudinal axis, and a plurality of mechanical linkages, each linkage coupled at a first end with a first respective spacecraft and coupled at a second end with one of the plurality of branch members, the trunk member or a second respective spacecraft.

In some examples, the orbiting system may include a robotic manipulator and deploying one or both of the first spacecraft and the second spacecraft may include selecting a set of the plurality of mechanical linkages, each mechanical linkage in the set being coupled at a first respective end with the first spacecraft and at a second respective end with a branch member, the trunk member or a second spacecraft, detaching, with the robotic manipulator, each second respective end, grasping the first spacecraft, imparting a motion to the first spacecraft relative to the orbiting system and releasing the first spacecraft. In some examples, the orbiting system may include a sensor and the method may include, prior to releasing the first spacecraft, performing a physical inspection of the first spacecraft with the sensor. In some examples, the method may further include, prior to releasing the first spacecraft, detaching with the robotic manipulator each first respective end. In some examples, the orbiting system may include a debris management arrangement and the method may further include securing, with the robotic manipulator, each mechanical linkage in the set to the debris management arrangement.

In some examples, at least one of the plurality of mechanical linkages may include a first respective end coupled to the first respective spacecraft and a second respective end attached to the second respective spacecraft.

In some examples, at least one spacecraft of the plurality of spacecraft may be attached to a respective subset of the plurality of mechanical linkages and no mechanical linkage in the respective subset is attached to the trunk member.

In some examples, each of the mechanical linkages may include a spring-like coupling that provides substantial resistance to both compression and tension.

In some examples, one or more branch members may have a second end portion attached to the trunk member.

In some examples, one or more branch members may be attached to the trunk at a central portion and may have a second end portion that is substantially outboard from the longitudinal axis.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which:

FIG. 2 illustrates a system including a plurality of small spacecraft, a structural arrangement and a robotic manipulator, according to an implementation.

FIG. 6 illustrates a process flow diagram for deploying a spacecraft from an orbiting system.

FIG. 7 illustrates a process flow diagram for deploying a plurality of spacecraft from an orbiting system.

FIG. 10 illustrates some design considerations for spring constant selection for mechanical linkages coupling the spacecraft to branch members, in accordance with some implementations.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. It will be understood that although the terms "first" and "second" are used herein to describe various elements, these elements should not be limited by these terms. These terms are used only to distinguish one element from another element. As used herein, the term "and/or" includes any and all combinations of one or more of the associated listed items. The symbol "I" is also used as a shorthand notation for "and/or".

Figure 1:
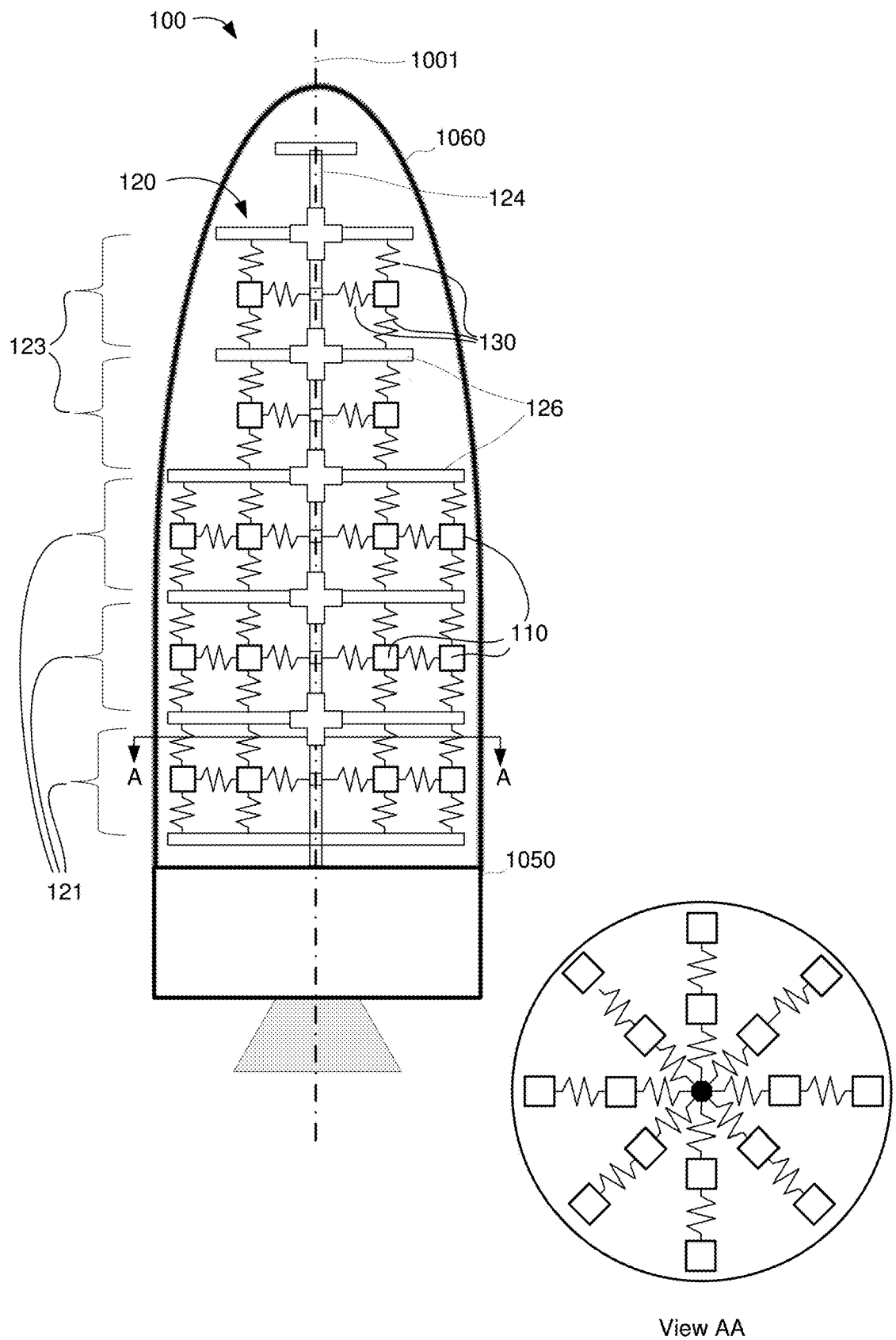
FIG. 1 illustrates a system including a plurality of small spacecraft and a structural arrangement, according to an implementation.

A single large launch vehicle may have a payload capability of several tons. The present disclosure relates to taking advantage of such payload capability to simultaneously launch a large number of smallsats. Referring now to FIG. 1, a system 100 includes a plurality of small spacecraft 110 and a structural arrangement 120. The structural arrangement 120 is, advantageously, configured to provide the only load path between the plurality of spacecraft 110 and a launch vehicle upper stage 1050. The structural arrangement 120 may be configured as a lightweight tree-like structure that includes at least one member 124 approximately aligned with the launch vehicle longitudinal axis 1001 (that may be referred to herein as a "trunk member") and a plurality of "branch" members 126. Each branch member 126 has an end portion that is substantially outboard from the longitudinal axis 1001. In the illustrated implementation, each branch member 126 is approximately orthogonal to the trunk member 124, but other arrangements are contemplated wherein the branch member 126 may be disposed at an acute angle to the longitudinal axis 1001.

The system 100 may include a number of mechanical linkages 130. The structural arrangement 120 may be configured to include interfaces with which the mechanical linkages 130 may be coupled. Each mechanical linkage 130 may be a spring-like coupling that provides substantial resistance to both compression and tension. In the illustrated implementation, each mechanical linkage 130 is detachably coupled at a first end with a first respective spacecraft 110 and is detachably coupled at a second end with either of: one of the plurality of branch members 126, the at least one trunk member 124, or a second respective spacecraft 110.

In an implementation, the structural arrangement 120 conforms to the cylindrical/conical inner surface a launch vehicle fairing 1060 so as to efficiently utilize the interior volume of the launch vehicle fairing. The mechanical linkages 130 between the spacecraft 110 may be structurally modeled as mechanical springs configured to resist both compressive and tensile forces. A spring constant of the mechanical linkages 130 may be selected such that the system (structural arrangement 120, mechanical linkages 130 and spacecraft 110) exhibits a requisite degree of stiffness. In addition to supporting the small spacecraft 110, the mechanical linkages 130 may also prevent physical contact between individual spacecraft 110 in the face of launch vibration and acoustic loads, thus preventing damage to the spacecraft 110.

In the configuration illustrated in FIG. 1, 64 small spacecraft 110 are contemplated (16 spacecraft 110 disposed in each of three lower tiers 121, and 8 spacecraft 110 disposed in each of two upper tiers 123). The illustrated 3D lattice-like arrangement of spacecraft may be considerably more extensive than illustrated. As a result, a much greater number of very small spacecraft, for example one thousand or more nanosats, may be accommodated by the illustrated techniques.

Advantageously, mechanical couplings between the supporting structure 120 and the launch vehicle fairing 1060 are avoided, in order to simplify separation of the launch vehicle fairing 1060 during or after ascent to orbit. Instead, the spacecraft 110 are mechanically coupled, by way of the branch members 126 and the trunk member 124 to the launch vehicle upper stage 1050. In the illustrated implementation, the trunk member 124 extends vertically along the launch vehicle longitudinal axis 1001. The trunk member 124 may be the primary load-path between the lattice arrangement and the launch vehicle upper stage 1050. The system 100 may be assembled prior to launch from its individual components. For example, a desired number of branch members 126 may first be attached to the trunk member 124, forming a tree-like structural arrangement 120. Subsequently, the small spacecraft 110 may then be attached to the structural arrangement 120, using the mechanical linkages 130. Each small spacecraft 110 may be supported, by way of detachable couplings with the mechanical linkages 130 to form the illustrated three-dimensional lattice-like structure.

In addition to those mechanical linkages 130 that couple a spacecraft 110 with the trunk member 124 or with a branch member 126, some mechanical linkages 130 may couple one spacecraft 110 with a neighboring spacecraft 110, as may be better observed in View A-A.

The spacecraft 110 may be detached from the structural arrangement 120 following ascent to orbit. In an embodiment, illustrated in FIG. 2, the system 100 includes one or more robotic arms 250 configured to detach the spacecraft 110 from the structural arrangement 120. In other implementations, a robotic arm mounted on a free-flying spacecraft (not illustrated) that may be carried to orbit by the same launch vehicle as the many small spacecraft. This servicing craft could also be carried to orbit by a separate launch vehicle. In such a case, the servicing craft may be configured to perform orbital rendezvous and then dock with the launch vehicle carrying the small spacecraft.

Figure 3:
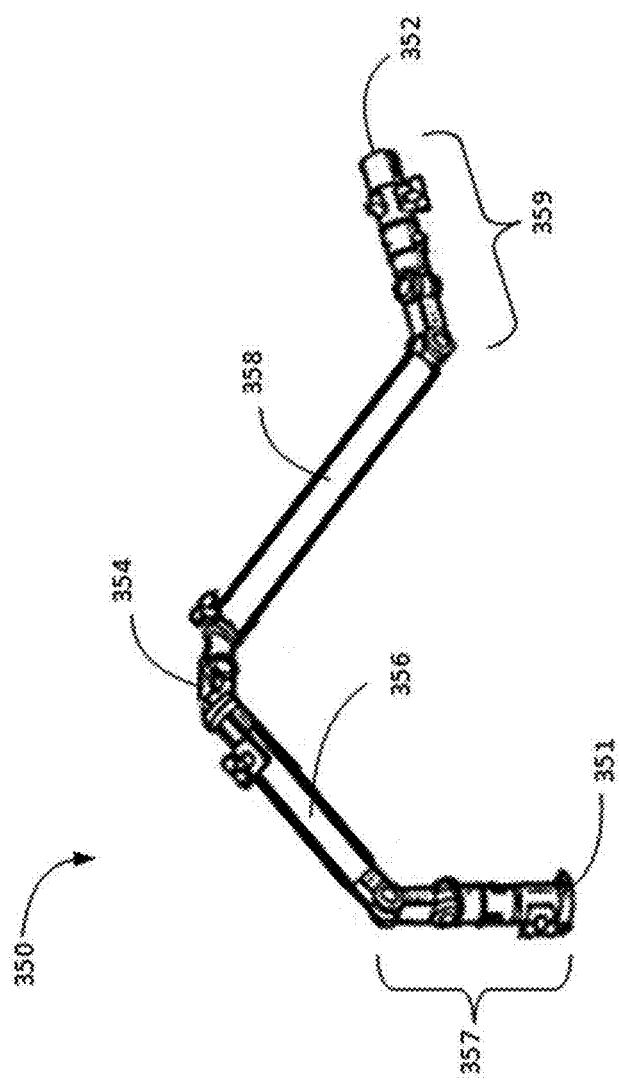
FIG. 3 illustrates an example of a robotic manipulator, according to an implementation.

In some implementations, the robotic manipulator 250 may include a robotic arm having two end effectors and a number of articulable joints disposed therebetween. For example, referring now to FIG. 3, an example of a robotic manipulator will be described. Manipulator 350 includes first and second longitudinally elongated arms 356 and 358. Respective proximal ends of the arms 356 and 358 may be coupled together by means of an elbow joint 354. Articulator 357 including one or more articulable joints may be coupled with a distal end of arm 356. Similarly, articulator 359 may be coupled with a distal end of arm 358. In some implementations one or both of the articulator 357 and the articulator 359 includes a pitch joint, a yaw joint, and a roll joint. First and second end effectors 351 and 352 may be mounted at the respective distal ends of the articulators 357 and 359.

The mass of the robotic manipulator(s) 250 used to disassemble the lattice may be expected to be a small fraction of the aggregate total mass of the multiple spacecraft 110. The robotic manipulator 250 may be configured to detach mechanical linkages 130. The robotic manipulator 250 may move each small spacecraft 110, one by one, for example, a safe distance from the remaining spacecraft and provide the spacecraft 110 with a modest delta-V to assure positive separation. The robotic manipulator 250 may also be used to facilitate inspection of any or all of the small spacecraft 110 prior to separation. For example, the robotic manipulator 250 may be configured to position a selected small spacecraft 110 in view of a camera or various other sensors. The robotic manipulator 250 may be used to secure the detached mechanical linkages to or within a debris management arrangement such as a storage bin or bins (not illustrated) to avoid creation of orbital debris.

Figure 4:
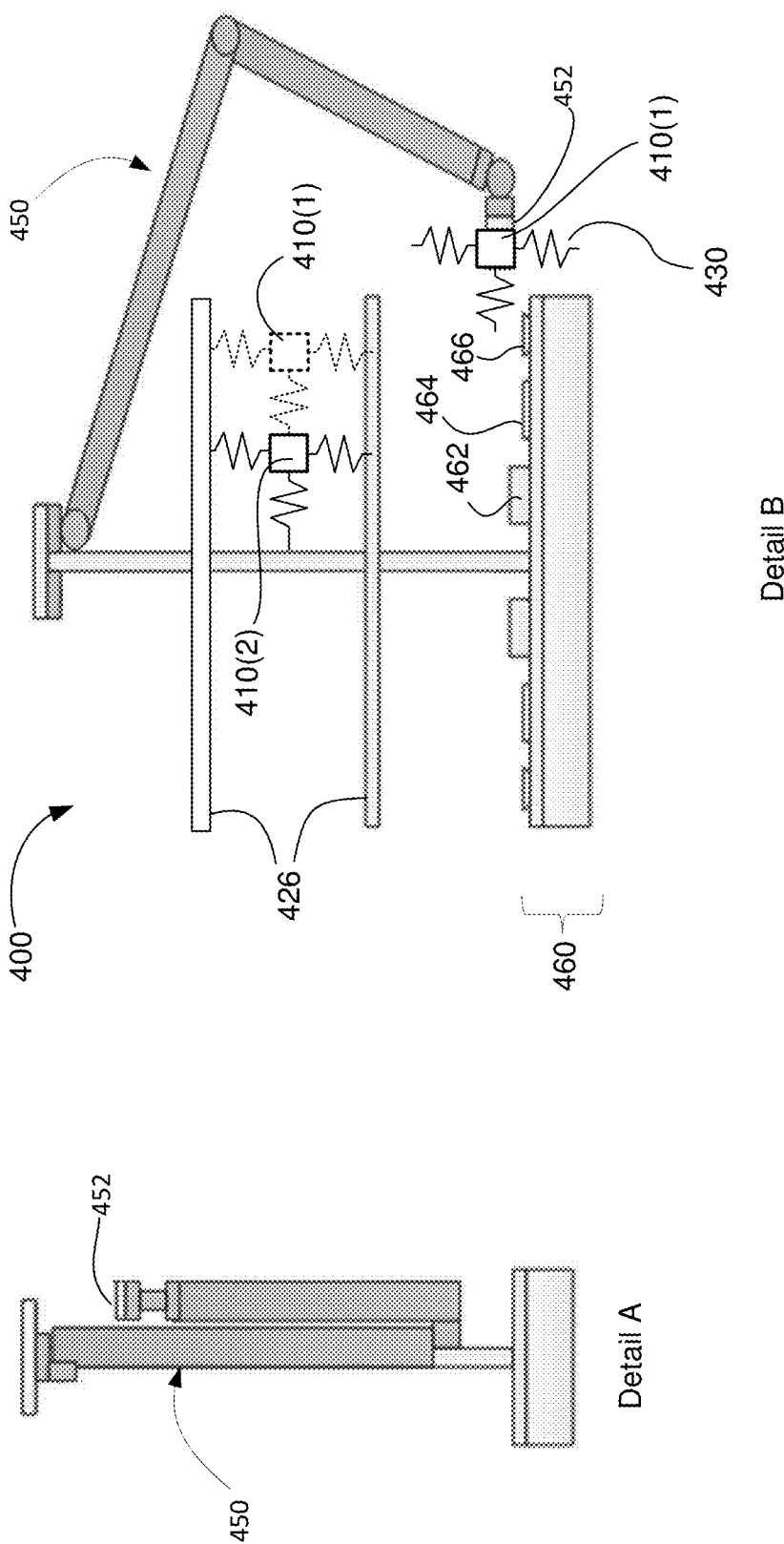
FIG. 4 illustrates a conceptual view of a system that includes a robotic manipulator configured for use in a deployment process.

FIG. 4 illustrates a conceptual view of a system 400 that includes a robotic manipulator 450 configured for use in a deployment process. In Detail A, the robotic manipulator 450 is illustrated as being in a stowed configuration; in Detail B, the robotic manipulator 450 is illustrated as being in a deployed configuration. In the illustrated implementation, a single robotic manipulator 450 is illustrated, but it will be appreciated that two or more robotic manipulators 450 may be contemplated in order to provide a desired degree of redundancy.

In some implementations, one or all of the robotic manipulators 450 may have a range of motion which covers the entire interior of the launch vehicle fairing. Whether or not the robotic manipulator 450 has such a range of motion, the robotic manipulator 450 may be configured as a self-relocatable manipulator, such as described, for example, in U.S. Pat. No. 4,585,388, the disclosure of which is hereby incorporated by reference into the present application in its entirety.

In some implementations, the robotic manipulator 450 may include a first end effector 452, configured to facilitate the detachment, inspection and deployment of each individual spacecraft. For example, the first end effector 452 may be configured to interface with a small spacecraft 410 and/or a mechanical linkage 430. In some implementations, the robotic manipulator 450 may sequentially grasp, with the first end effector 452, each small spacecraft 410 one at a time. As illustrated in Detail B, the robotic manipulator 450 may be configured to detach the mechanical linkages 430 coupling a spacecraft 410(1) from the supporting branches 426 and an adjacent spacecraft 410(2) before grasping the spacecraft 410 and moving it away from a first position (dashed line) to a second position (solid line).

In some implementations the second position may be a location from which the spacecraft 410(1) is to be separated (deployed) from the system 400. In the illustrated implementation, however, the system 400 is configured to perform one or more of the following additional processes before the spacecraft 110(1) is deployed. More particularly, the system 400 includes a module 460 for inspection, testing and/or servicing of the spacecraft 110. In the illustrated implementation the module 460 includes a debris management arrangement 462, a second end effector 464, and an inspection station 466. The second position, accordingly, may be proximate to the inspection station 466 which may include a sensor (e.g., a camera or other imager) for physical inspection of the spacecraft 410(1). The second position may also be proximate to the second end effector 464. Subsequent and/or prior to physical inspection of the spacecraft 410(1), the robotic manipulator 450 may be configured to place the spacecraft 410(1) so as to engage the second end effector 464. The second end effector 464 may be configured to grasp the spacecraft 410(1), following which the robotic manipulator 450 may disengage from the spacecraft 410(1) and proceed with other tasks while the spacecraft is held in place by the second end effector 464. For example, the robotic manipulator 450 may grasp and detach individual mechanical linkages 430 from the spacecraft 410(1), and secure the detached mechanical linkages 430 to the debris management arrangement 462. In some implementations the debris management arrangement may be a storage bin and securing the detached mechanical linkages 430 to the debris management arrangement 462 may include placing the detached mechanical linkages 130 inside the storage bin. As a result, creation of orbital debris may be avoided. The storage bin 462 may also be used to dispose of spacecraft which have failed the physical inspection procedure. The module 460 may further include interfaces by which check-out and pre-deployment procedures for the spacecraft 410 may be accomplished, including, for example, mechanical or electrical subsystem checkouts.

Upon completion of the foregoing processes, the robotic manipulator 450 may reengage the spacecraft 410 which may then be released from the second end effector 464. The robotic manipulator 450 may then proceed to deploy the spacecraft 410 through a combination of an axial movement and release, similar to a "throwing mechanism". The release may be timed such that the arm will provide the desired delta-V to the spacecraft 410. Upon completion of the deployment task, the robotic manipulator 450 may move on to the next spacecraft in sequence.

In some implementations, the structural arrangement 420 may include propulsion capability and/or remain attached to a launch vehicle upper stage that has propulsion capability. In such implementations, the structural arrangement, following deployment of the smallsats, may be deorbited by the onboard propulsion capability.

Figure 5:
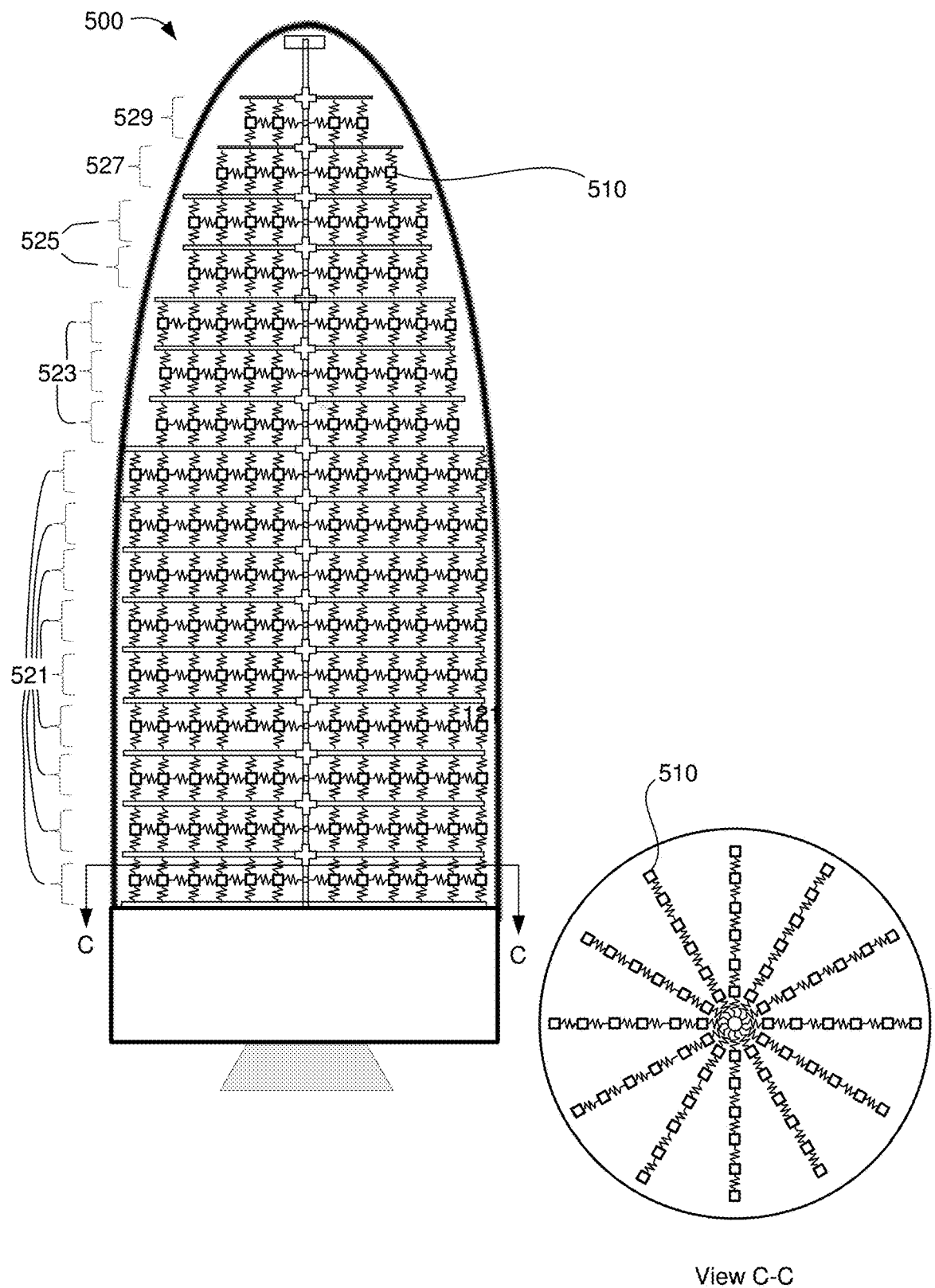
FIG. 5 illustrates a system including a plurality of small spacecraft and a structural arrangement, according to another implementation.

As indicated above in connection with FIG. 1, the presently disclosed techniques contemplate a launch vehicle payload that includes a large number of relatively small spacecraft disposed in an arrangement that efficiently uses available launch vehicle fairing volume. FIG. 5 illustrates an example implementation that includes 16 tiers, each tier including a number of smallsats 510. More particularly, in the illustrated implementation, nine lower tiers 521 each include 72 smallsats 510, three intermediate tiers 523 each include 60 smallsats 510; two intermediate tiers 525 each include 48 smallsats 510; one intermediate tier 527 includes 36 smallsats 510; and one upper tier 529 includes 24 small sets 510. Thus, in the illustrated implementation, as many as 984 smallsats 510 may be accommodated.

FIG. 6 illustrates a process flow diagram for deploying a plurality of spacecraft from an orbiting system. The method 600 may start, at block 610, by deploying a first one of the plurality of spacecraft from the orbiting system. The method may continue, at block 620, by deploying a second one of the plurality of spacecraft. As described hereinabove, the orbiting system may include the plurality and a structural arrangement providing a load path between a launch vehicle upper stage and the plurality of spacecraft. Each spacecraft may be mechanically coupled with the launch vehicle upper stage only by the structural arrangement. The structural arrangement may include at least one trunk member that is approximately aligned with the longitudinal axis of the launch vehicle upper stage, a plurality of branch members, each branch member being attached to the trunk member and having at least a first end portion that is substantially outboard from the longitudinal axis, and a plurality of mechanical linkages, each linkage coupled at a first end with a first respective spacecraft and coupled at a second end with one of the plurality of branch members, the trunk member or a second respective spacecraft.

FIG. 7 illustrates a process flow diagram for deploying the spacecraft from the orbiting system, according to some implementations. The method 700 may be executed as part of one or both of block 610 and block 620 of the method 600 where the orbiting system includes a robotic manipulator as described above. The method 700 may start, at block 710, with detaching, using the robotic manipulator, each respective second end of the mechanical linkages coupled with the spacecraft. The method 700 may continue, at block 720 with grasping the spacecraft with the robotic manipulator.

As described hereinabove the robotic manipulator may be configured to deploy the spacecraft by imparting a delta V to the spacecraft relative to the orbiting system. Accordingly, the method 700 may continue at block 760 imparting a relative motion to the spacecraft and, at block 770, releasing the spacecraft.

Optionally, in some implementations one or more of additional process block 730, 740 and 750 may be executed prior to block 760. In some limitations, for example, the orbiting system includes a sensor, and block 730 may be executed, so as to perform a physical inspection of the spacecraft using the sensor.

Whether or not optional block 730 is executed, in some implementations the robotic manipulator may optionally be used to detach each respective first end of the mechanical linkages coupled with the spacecraft. Moreover, in some implementations the orbiting system includes a debris management arrangement, and the method 700 optionally includes executing block 750 so as to secure detached linkages to the debris management arrangement.

It should be noted that, although the above described methods have related to the deployment single spacecraft, one spacecraft at a time, the present disclosure contemplates that, in some implementations, two or more smallsats may be deployed simultaneously. In some implementations the two or more smallsats may be coupled together with mechanical linkages at the time of deployment. In some implementations the two or more smallsats may share a common propulsion system.

Figure 8:
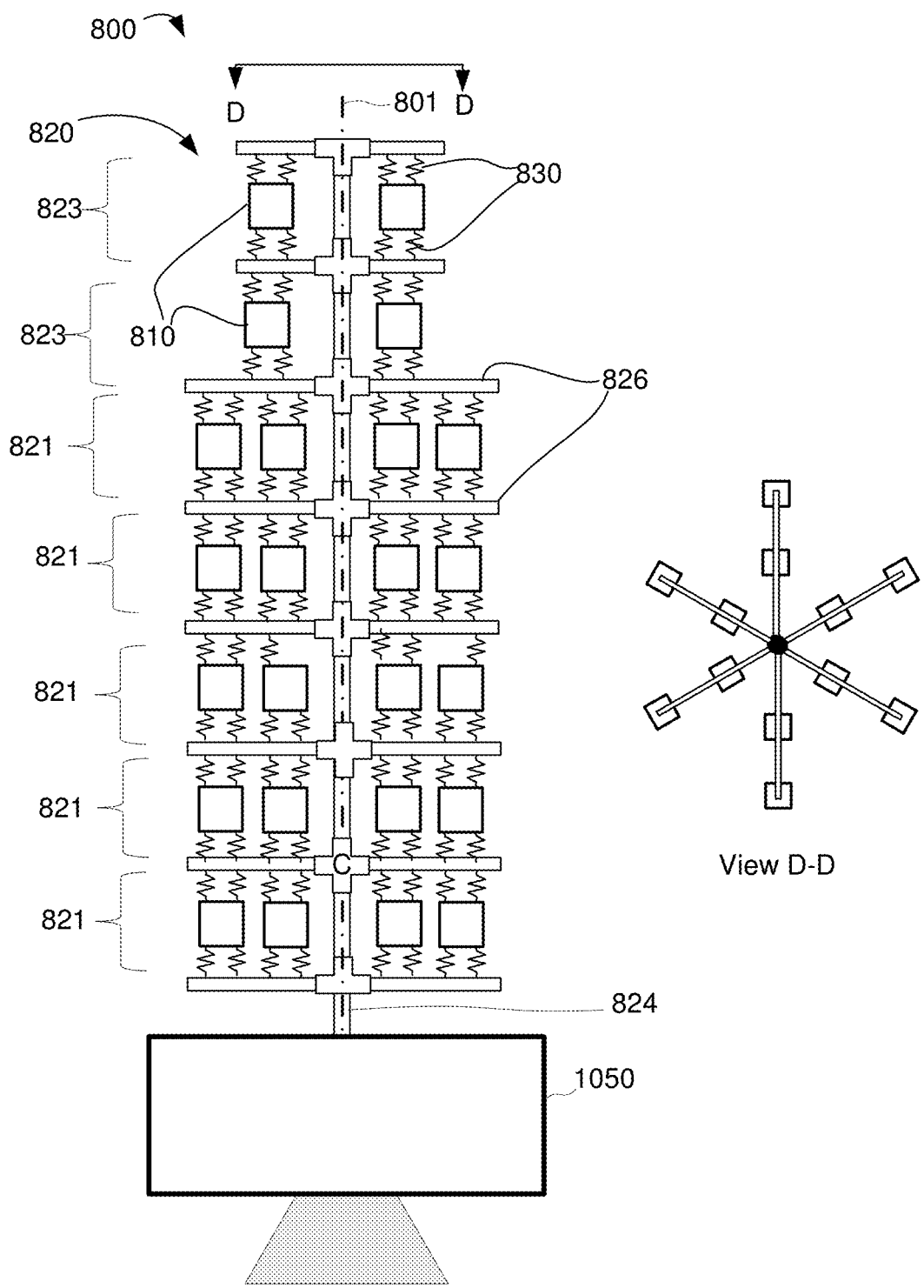
FIG. 8 illustrates a system including a plurality of small spacecraft and a structural arrangement, according to another implementation.

In some implementations, a need for a robotic manipulator may be avoided. For example, a system including a plurality of small spacecraft and a structural arrangement may be configured to detach at least one of the plurality of spacecraft from the structural arrangement, and deploy the spacecraft by rotating or translating the structural arrangement. Referring now to FIG. 8, a system 800 includes a plurality of small spacecraft 810 and a structural arrangement 820. The structural arrangement 820 is, advantageously, configured to provide the only load path between the plurality of spacecraft 810 and the launch vehicle upper stage 1050. The structural arrangement 820 may be configured as a lightweight tree-like structure that includes at least one trunk member 824 approximately aligned with a longitudinal axis 801 and a plurality of branch members 826. Each branch member 826 has an end portion that is substantially outboard from the longitudinal axis. In the illustrated implementation, each branch member 126 is approximately orthogonal to the trunk member 824, but other arrangements are contemplated wherein the branch member 826 may be disposed at an acute or obtuse angle to the longitudinal axis 801.

The system 800 may include a number of mechanical linkages 830. The structural arrangement 820 may be configured to include interfaces with which the mechanical linkages 830 may be coupled. Each mechanical linkage 830 may be a spring-like coupling that provides substantial resistance to both compression and tension. In the illustrated implementation, each mechanical linkage 830 is detachably coupled at a first end with a first respective spacecraft 810 and coupled at a second end with a respective one of the plurality of branch members 826.

Advantageously, the structural arrangement 820 may conform to the cylindrical/conical inner surface of a launch vehicle fairing so as to efficiently utilize the interior volume of the launch vehicle fairing. The mechanical linkages 830 between the spacecraft 810 may be structurally modeled as mechanical springs configured to resist both compressive and tensile forces. A spring constant of the mechanical linkages 830 may be selected such that the system (structural arrangement 820, mechanical linkages 830 and spacecraft 810) exhibits a requisite degree of stiffness. In addition to supporting the small spacecraft 810, the mechanical linkages 830 may also prevent physical contact between individual spacecraft 810 in the face of launch vibration and acoustic loads, thus preventing damage to the spacecraft 810. In some implementations, a mechanical coupling between each branch member 826 and a corresponding surface of a spacecraft 810 includes two or more mechanical linkages 830. In an implementation, each such mechanical coupling includes four mechanical linkages 830.

In the configuration illustrated in FIG. 8, 72 small spacecraft 810 are contemplated (12 spacecraft 810 disposed in each of five lower tiers 821, and 6 spacecraft 810 disposed in each of two upper tiers 823). As indicated above, a 3D lattice-like arrangement of spacecraft may be considerably more extensive than illustrated. As a result, a much greater number of very small spacecraft, for example one thousand or more nanosats, may be accommodated by the present disclosure.

Advantageously, mechanical couplings between the supporting structure 820 and the launch vehicle fairing may be avoided, in order to simplify separation of the launch vehicle fairing during or after ascent to orbit. Instead, the spacecraft 810 are mechanically coupled, by way of the branch members 826 and the trunk member 824 to the launch vehicle upper stage. In the illustrated implementation, the trunk member 824 extends vertically along the longitudinal axis 801. The trunk member 824 may be the primary load-path between the lattice arrangement and the launch vehicle upper stage.

Figure 9:
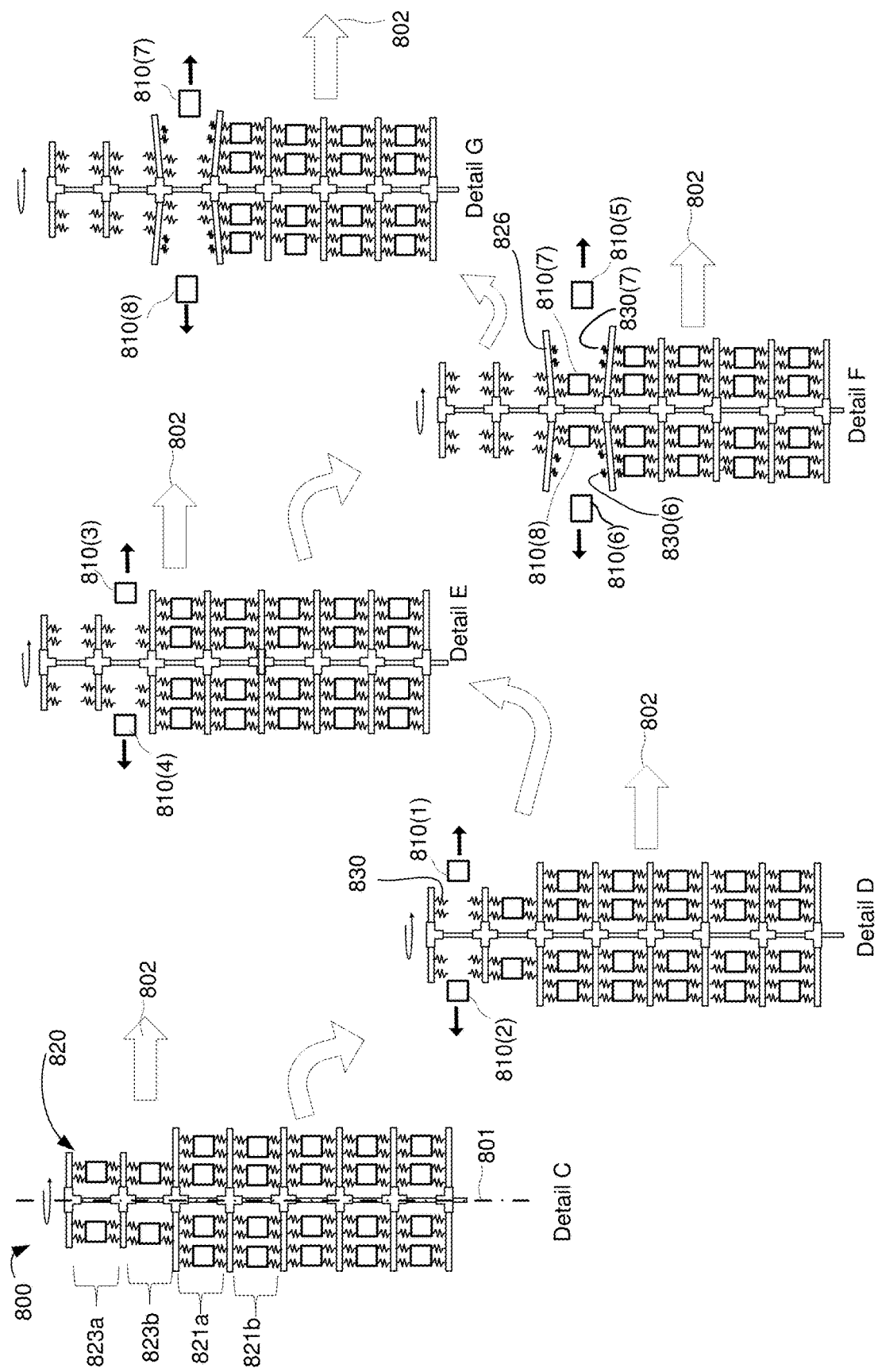
FIG. 9 illustrates techniques for deploying the plurality of small spacecraft from the structural arrangement, according to another implementation.

As is illustrated in FIG. 9, the spacecraft 810 may be separated (deployed) from the structural arrangement 820, upon achieving orbit, without necessarily relying on a robotic manipulator. In the illustrated example, deployment may be initiated by orienting the structural arrangement 820 such that the longitudinal axis 801 is approximately transverse to a direction of orbital velocity vector 802 and causing the structural arrangement 820 to rotate about the longitudinal axis 801 (Detail C). A centrifugal pseudo force will be experienced by the spacecraft 810, directed radially outward from the longitudinal axis 801. A selected one or more spacecraft 810 may accordingly be separated passively from the structural arrangement 820, by disengaging the mechanical linkages 830 coupling the selected spacecraft 810 with the structural arrangement 820. In the illustrated example, referring now to Detail D, two spacecraft 810, spacecraft 810(1) and 810(2) may be deployed approximately simultaneously, in opposite directions, parallel to the orbital velocity vector 802. As a result, each spacecraft will drift away from each other and from the structural arrangement 820. Advantageously, the disengaged mechanical linkages 830 may be configured to remain with the structural arrangement 820 when the spacecraft are separated, thereby avoiding creation of orbital debris.

Referring now to Detail E, after a desired separation between the deployed spacecraft 810(1) and 810(2) has been achieved (and, optionally, after any other spacecraft on upper tier 823a have been deployed), an additional two spacecraft 810, spacecraft 810(3) and 810(4) may be similarly deployed approximately simultaneously, in opposite directions, parallel to the orbital velocity vector 802. As a result, each spacecraft will drift away from each other and from the structural arrangement 820. As indicated above, the disengaged mechanical linkages 830 may be configured to remain with the structural arrangement 820 when the spacecraft are separated, thereby avoiding creation of orbital debris.

Referring now to Detail F, after a desired separation between the deployed spacecraft 810(3) and 810(4) has been achieved (and, optionally, after any other spacecraft on upper tier 823b have been deployed), an additional spacecraft 810, spacecraft 810(5) and 810(6) may be similarly deployed approximately simultaneously, in opposite directions, parallel to the orbital velocity vector 802. It may be observed that spacecraft 810(5) and 810(6) are outboard of, respectively spacecraft 810(7) and 810(8). Mechanical linkages 830 associated with such outboard spacecraft (e.g., mechanical linkages 830(6) and 830(7) may be configured to be in tension while coupled with a respective spacecraft and to retract naturally once the respective spacecraft are deployed. As a result, an unobstructed path for deployment of inboard spacecraft 810(7) and 810(8) may be passively achieved. The deployment path for inboard spacecraft 810(7) and 810(8) may be further passively improved by configuring one or more of the branch members 826 as flexures. As may be observed in Detail G, when spacecraft 810(5) and 810(6) are disengaged from mechanical linkages 830(5) and 803(6) of lower tier 821a, loads on associated branch members 826, directly above and below lower tier 821a, are released. As a result, the associated branch members may be configured to flex in opposite directions (i.e., outer ends of upper branch members may flex upward, outer ends of lower branch members may flex downward).

Referring now to Detail G, after a desired separation between the deployed spacecraft 810(5) and 810(6) has been achieved (and, optionally, after any other spacecraft on lower tier 821a have been deployed), an additional two spacecraft 810, spacecraft 810(7) and 810(8), may be similarly deployed approximately simultaneously, in opposite directions, parallel to the orbital velocity vector 802.

FIG. 10 illustrates some design considerations for spring constant selection for mechanical linkages coupling the spacecraft to branch members. On the one hand, if all mechanical linkages used on a single launch are configured to have the same spring constant (k), the mechanical linkages may be interchangeable, which would save procurement, labor and other costs. However, because it is likely that all spacecraft have a similar mass the period of oscillation of all spacecraft would be similar if the same spring constant were applied throughout the configuration. As a result, all spacecraft may undergo synchronized oscillations, which could damage the supporting structure.

Advantageously, mechanical linkage spring constants may be selected so as to avoid rotational motions of a spacecraft around an axis transverse to the longitudinal axis when the launch vehicle is under thrust and is generating vibrations. Thus, referring now to Detail H, for each individual spacecraft, mechanical linkages coupling an upper surface of the spacecraft with a branch member above the spacecraft may be configured to have the same spring constant, $k_U$; similarly, all mechanical linkages coupling a lower surface of the spacecraft with a branch number below the spacecraft on the bottom of a particular spacecraft may be configured to have the same spring constant, $k_L$. Use of a consistent spring constant is also advantageous to keep the spacecraft level when they are at rest with respect to the supporting structure, for example when the launcher is not applying thrust.

As described above, the launch vehicle upper stage may be configured to rotate around its longitudinal axis to facilitate deployment of the spacecraft. When this rotation is established, the spacecraft will be displaced radially outward, away from the longitudinal axis and trunk member of the supporting structure. Advantageously, the displacement should be entirely transverse to the longitudinal axis avoid any significant displacement parallel to the longitudinal axis. Thus, referring now to Detail J, the spring constant $k_U$ of the upper mechanical linkages and the spring constant $k_L$ of the lower mechanical linkages on each spacecraft may be configured to be the same ($k_1$). Advantageously, moreover the upper mechanical linkages on the lower mechanical linkages may be configured to have approximately the same length As a result, lengths $x_1$ and $x_2$ would be about the same when the launch vehicle is not under thrust and is under weightless or zero-g conditions because the upper and lower springs will have the same similar length and spring constant to satisfy the conditions above. The lengths would also be about the same when the launcher, in zero-g conditions is rotating to support deployment of the spacecraft. When the launcher is under thrust or is at rest on the surface of Earth prior to launch the lengths would differ, making $x_1$ longer and $x_2$ shorter as a result of the upper mechanical linkages experiencing tension in the lower mechanical linkages experiencing compression.

The spring constants of mechanical linkages associated with opposite pairs of spacecraft that are simultaneously separated may also need to be similar to avoid a significant disturbance of the supporting structure when deployment occurs.

The mechanical linkages of spacecraft disposed outboard of other spacecraft in a common tier may be configured retract upon deployment such spacecraft, as described above. However, the mechanical spacecraft proximal to the longitudinal axis need not retract upon deployment of such spacecraft. Therefore, these mechanical linkages may be configured to have significantly different characteristics from the mechanical linkages of the outboard spacecraft. For example, referring to Detail K, a spring constant $k_2$ for mechanical linkages associated with an inner spacecraft springs may be configured to be lower than a spring constant $k_1$ of mechanical linkages associated with an outer spacecraft. Moreover, the springs may be configured to have a longer natural length than those on the outer spacecraft.

In some embodiments the spring constant of mechanical linkages associated with all outer spacecraft could have the same constant $k_1$ and the spring constant of mechanical linkages associated with all inner spacecraft could have the same spring constant $k_2$. As a result of such configuration not all spacecraft will oscillate with the same period, although groups of spacecraft could oscillate together, simultaneous deployments of opposite pairs of spacecraft would result in minimal disturbance torques.

In some implementations four-point separation concept may be incorporated, in which, for each spacecraft, four mechanical linkages couple an upper surface of the spacecraft with a branch member above the spacecraft and four mechanical linkages couple a lower surface of the spacecraft with a branch number below the spacecraft.

In some implementations, notwithstanding that the mechanical linkages inherently have some natural damping, additional damping may be included to prevent an undesirable increase in the amplitude of the oscillatory motion of the spacecraft. Such damping would tend to increase the time for the springs on the outer spacecraft to retract and provide clearance for deployment of inner spacecraft and a deployment sequence may be configured to provide sufficient time between deployment of outer spacecraft on a given tier and inner spacecraft on that tier for the springs to sufficiently retract.

In some implementations, the period of rotation is expected to exceed ten seconds during this spacecraft deployment. Pairs of spacecraft would be deployed no more than once every half-rotation so that the motion of the separated spacecraft is approximately parallel to the direction of orbital motion. Delaying separation of the next pair by one-half or more rotations may be considered to provide sufficient time for the springs to retract in some implementations, the spin rate of the launch vehicle may be reduced as spacecraft are in order to reduce the risk that later-separated spacecraft overtake a previously separated spacecraft.

It should be appreciated that an inner spacecraft will not overtake an outer spacecraft because inner spacecraft spin speed, as measured in meters per second, would always be less than that of the outer spacecraft if the launcher were rotating at a constant rate. This is because the radius of rotation of the inner spacecraft is less than that of the outer spacecraft.

In some implementations the upper spacecraft are the first to be separated and are inner spacecraft. The launcher rotation might be set to a higher rate for these spacecraft to avoid outer spacecraft separated later from catching up with them. An alternative would be to allow extra time between these first few separation events and the deployment of the remainder of the spacecraft.

Figure 11A:
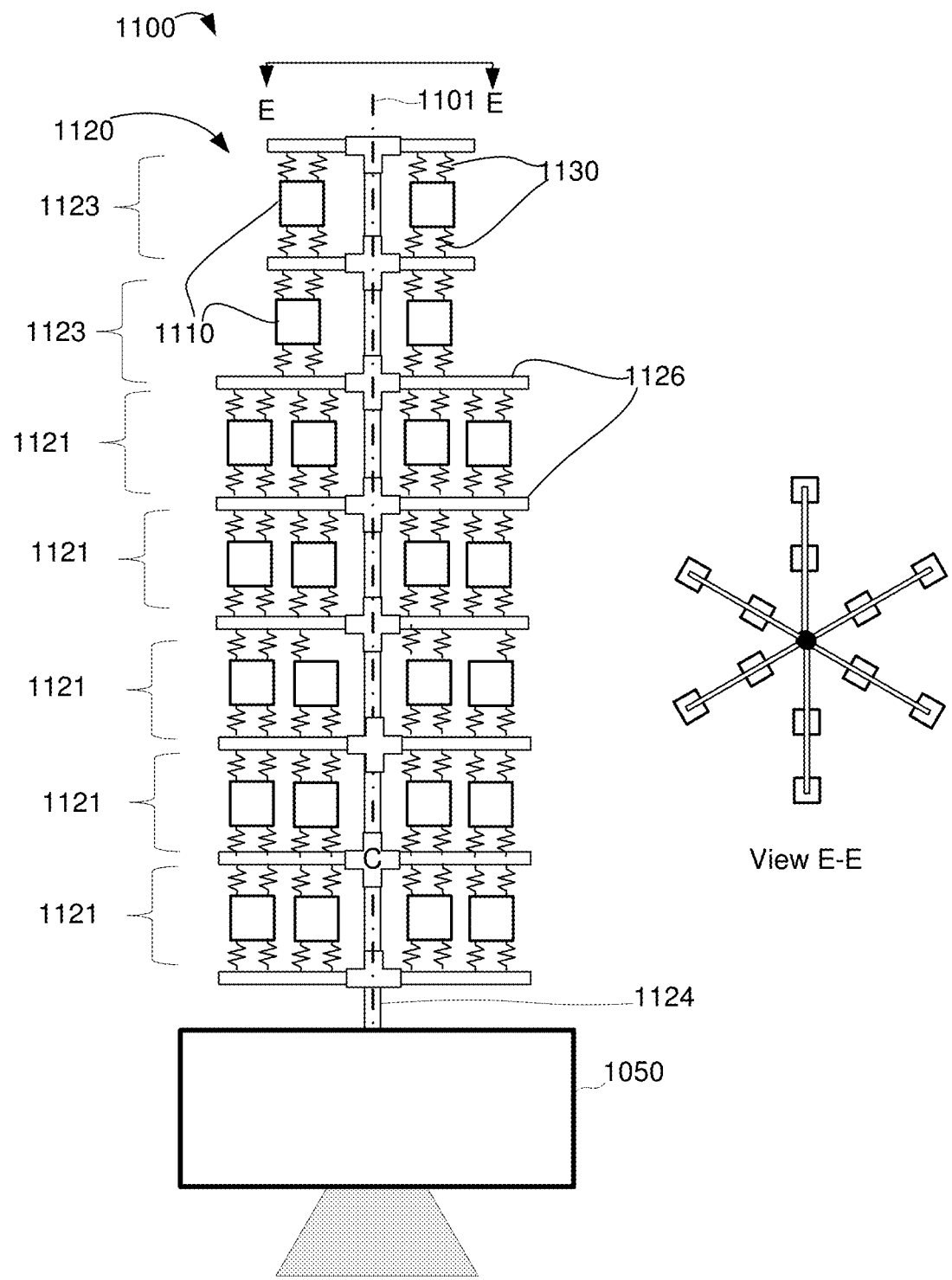
FIGS. 11A and 11B illustrate techniques for deploying the plurality of small spacecraft from the structural arrangement, according to another implementation.
Figure 11B:
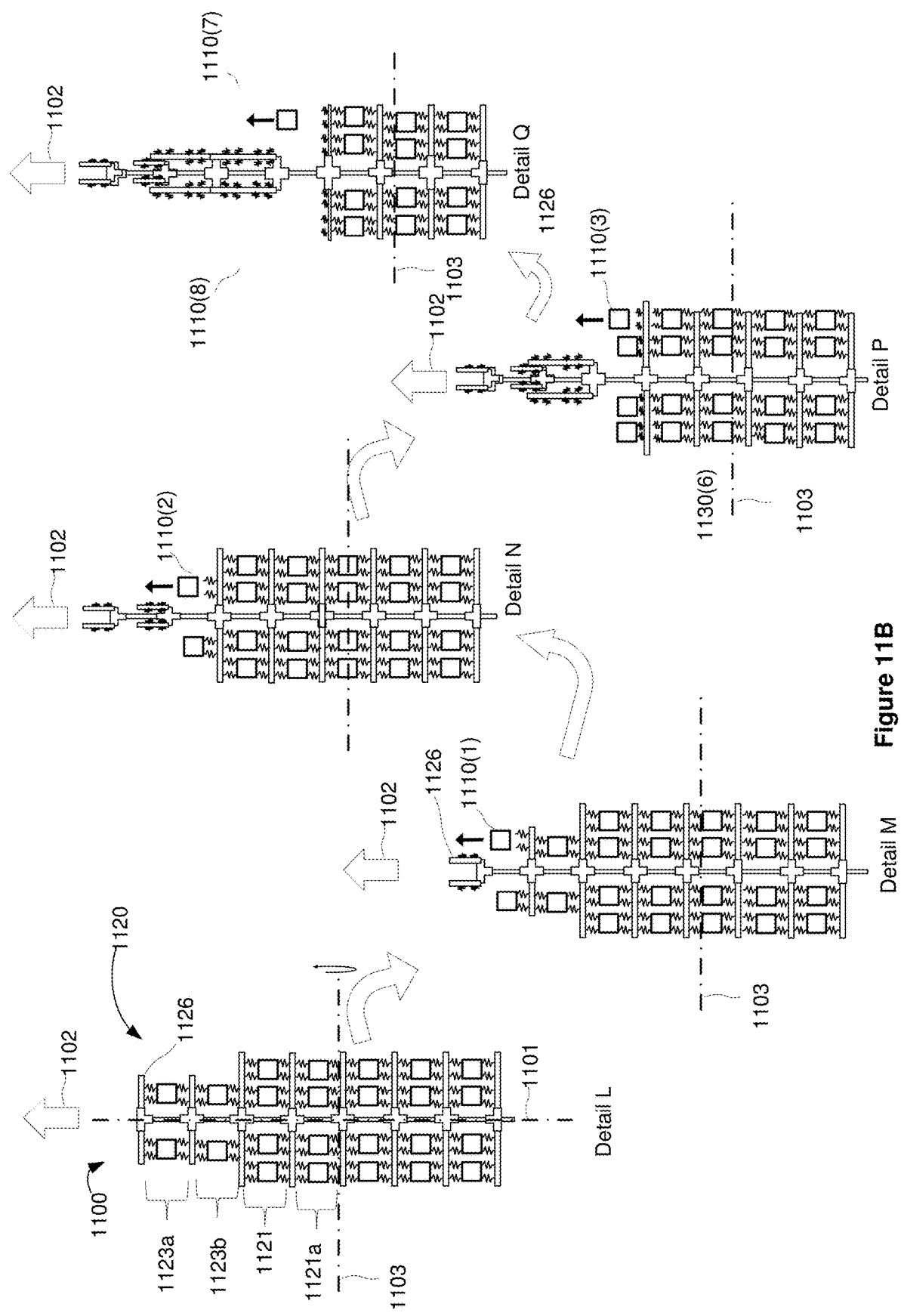

FIGS. 11A and 11B illustrate an example of a further implementation in which a need for a robotic manipulator may be avoided. Similarly to the example described in connection with FIG. 8, a system including a plurality of small spacecraft and a structural arrangement may be configured to detach at least one of the plurality of spacecraft from the structural arrangement, and deploy the spacecraft by rotating the structural arrangement. Here, a system 1100 includes a plurality of small spacecraft 1110 and a structural arrangement 1120. The structural arrangement 1120 is, advantageously, configured to provide the only load path between the plurality of spacecraft 1110 and the launch vehicle upper stage 1050. The structural arrangement 1120 may be configured as a lightweight tree-like structure that includes at least one trunk member 1124 approximately aligned with a longitudinal axis 1101 and a plurality of branch members 1126. Each branch member 1126 has an end portion that is substantially outboard from the longitudinal axis.

The system 1100 may include a number of mechanical linkages 1130. The structural arrangement 1120 may be configured to include interfaces with which the mechanical linkages 1130 may be coupled. Each mechanical linkage 1130 may be a spring-like coupling that provides substantial resistance to both compression and tension. In the illustrated implementation, each mechanical linkage 1130 is detachably coupled at a first end with a first respective spacecraft 1110 and coupled at a second end with a respective one of the plurality of branch members 1126.

In the configuration illustrated in FIG. 11, 72 small spacecraft 1110 are contemplated (12 spacecraft 1110 disposed in each of five lower tiers 1121, and 6 spacecraft 1110 disposed in each of two upper tiers 1123).

As is illustrated in FIG. 11B, the spacecraft 1110 may be separated (deployed) from the structural arrangement 1120, upon achieving orbit, without necessarily relying on a robotic manipulator. In the illustrated example, deployment may be initiated by orienting the structural arrangement 1120 such that the longitudinal axis 1101 (Detail L) is approximately aligned with a direction of orbital velocity vector 1102 and causing the structural arrangement 1120 to rotate about an axis 1103 that is approximately transverse to the longitudinal axis. A centrifugal pseudo-force will be experienced by the spacecraft 1110, directed radially outward from the transverse axis 1103. A selected one or more spacecraft 1110 may accordingly be separated passively from the structural arrangement 1120, by disengaging the mechanical linkages 1130 coupling the selected spacecraft 1110 with the structural arrangement 1120. In the illustrated example, referring now to Detail M, a spacecraft 1110(1) is shown being deployed approximately in a direction approximately parallel to the orbital velocity vector 1102. As a result, the spacecraft 1110(1) will drift away from the structural arrangement 1120. To facilitate the deployment, branch member 1126 may be configured articulate away from an intended deployment path of the spacecraft 1110(1). In the illustrated implementation, for example, at least some branch members 1126 may be hingedly coupled with the structural arrangement 1120, such that the branch member may be rotated from a first direction transverse to the longitudinal axis to a second direction approximately parallel to the longitudinal axis. Advantageously, the disengaged mechanical linkages 1130 may be configured to remain with the structural arrangement 1120 when the spacecraft are separated, thereby avoiding creation of orbital debris.

Referring now to Detail N, after a desired separation between the deployed spacecraft 1110(1) has been achieved and any other spacecraft on upper tier 1123a have been deployed, an additional spacecraft 1110(3) may be similarly deployed in a direction approximately parallel to the orbital velocity vector 1102. As a result, the spacecraft 1110(3) will drift away from the structural arrangement 1120.

Referring now to Detail P, after a desired separation between the deployed spacecraft 1110(2) has been achieved, and after any other spacecraft on upper tier 1123b have been deployed, an additional spacecraft 1110, spacecraft 1110(3) may be similarly deployed in a direction approximately parallel to the orbital velocity vector 1102.

Referring now to Detail Q, after a desired separation between the deployed spacecraft 1110(3) has been achieved, and after any other spacecraft on lower tier 1121a have been deployed, an additional spacecraft 1110(4) may be similarly deployed in a direction approximately parallel to the orbital velocity vector 1102.

In the illustrated implementation, successive tiers of spacecraft 1110 are deployed in a sequence such that spacecraft farther from the axis of rotation (axis 1103) are deployed prior to spacecraft that are closer to the axis 1103. It should also be observed that, as spacecraft are deployed, the location of axis 1103 (which passes through the center of mass of the systems 1100) moves toward the launch vehicle upper stage 1050 (omitted from FIG. 11B for clarity of illustration).

Instead of or in addition to rotation of the system as described above in connection with FIGS. 9-11, a need of a robotic manipulator to effect spacecraft deployment may be avoided by translating the system with respect to a spacecraft to be deployed. For example, after disengaging a spacecraft, thrusters disposed on the structural arrangement or the launch vehicle upper stage to which it is attached, may provide a delta-V to the system that causes the system to drift away from the spacecraft to be deployed. It will be appreciated that this may be accomplished with an impulse directed along an axis transverse to or parallel with the longitudinal axis of the structural arrangement. For example, if the structural arrangement, on orbit, is oriented such that its longitudinal axis is transverse to its orbital velocity vector, then impulse directed transversely to the longitudinal axis will accelerate or decelerate the system, and the disengaged spacecraft will separate from the system in a direction generally transverse to the longitudinal axis. As a further example, if the structural arrangement, on orbit, is oriented such that its longitudinal axis is aligned with its orbital velocity vector, then impulse directed parallel to the longitudinal axis will accelerate or decelerate the system, and the disengaged spacecraft will separate from the system in a direction generally parallel to the longitudinal axis.

Thus, techniques for enabling tens to thousands of smallsats to be simultaneously carried into space on a single launch vehicle, and subsequently deployed into orbit, have been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:
1. A system comprising:
a payload including a plurality of spacecraft configured for deployment in an orbit; and
a tree-like structural arrangement providing a load path between a launch vehicle upper stage and the plurality of spacecraft; wherein
each spacecraft is mechanically coupled with the launch vehicle upper stage only by the tree-like structural arrangement; and
the tree-like structural arrangement includes:
at least one trunk member that is approximately aligned with a longitudinal axis of the launch vehicle upper stage;
a plurality of branch members, each branch member having at least a first end portion that is substantially outboard from the longitudinal axis and a second end portion attached to the trunk member; and
a plurality of mechanical linkages, each mechanical linkage having a first respective end and a second respective end, wherein:
the first respective end of each mechanical linkage is detachably coupled with a first respective spacecraft;
the second respective end of each of the mechanical linkages is attached to one of the plurality of branch members, or the trunk member;
each of the mechanical linkages includes a spring-like coupling that provides resistance to both compression and tension, wherein:
the deployment of at least one spacecraft of the plurality of spacecraft from the system, when disposed in the orbit, comprises one of:
(A) aligning the longitudinal axis in an orientation with respect to an orbital velocity vector, the orientation being transverse to the orbital velocity vector; detaching the at least one spacecraft from respective mechanical linkages; and rotating the structural arrangement about the longitudinal axis or translating the structural arrangement by imparting an impulse directed substantially parallel to the orbital velocity vector; or
(B) aligning the longitudinal axis in an orientation with respect to an orbital velocity vector, the orientation being parallel to the orbital velocity vector; detaching the at least one spacecraft from respective mechanical linkages; and rotating the structural arrangement about an axis transverse to the longitudinal axis or translating the structural arrangement by imparting an impulse directed substantially parallel to the orbital velocity vector.

2. The system of claim 1, wherein each spacecraft is coupled directly only with one or both of at least one of the branch members and the trunk member of the tree-like structural arrangement and not with another spacecraft such that each of the mechanical linkages is attached to one of the plurality of branch members, or the trunk member.

3. The system of claim 2, wherein, when the at least one spacecraft is detached, each respective mechanical linkage is configured to retract toward a respective branch member, or the trunk member, to which the respective mechanical linkage is attached.

4. The system of claim 1, wherein the orientation is transverse to the orbital velocity vector.

5. The system of claim 4, wherein the deployment comprises rotating the structural arrangement about the longitudinal axis.

6. The system of claim 4, wherein the deployment comprises translating the structural arrangement by imparting an impulse directed substantially parallel to the orbital velocity vector.

7. The system of claim 1, wherein the orientation is parallel to the orbital velocity vector.

8. The system of claim 7, wherein the deployment comprises rotating the structural arrangement about an axis transverse to the longitudinal axis.

9. The system of claim 7, wherein the deployment comprises translating the structural arrangement by imparting an impulse directed substantially parallel to the orbital velocity vector.

10. A method comprising:
deploying, from an orbiting system including a plurality of spacecraft, a first spacecraft of the plurality of spacecraft; and
deploying, from the orbiting system, a second spacecraft of the plurality of spacecraft; wherein
a tree-like structural arrangement provides a load path between a launch vehicle upper stage and the plurality of spacecraft;
each spacecraft is mechanically coupled with the launch vehicle upper stage only by the structural arrangement; and
the tree-like structural arrangement includes at least one trunk member that is approximately aligned with a longitudinal axis of the launch vehicle upper stage, a plurality of branch members, each branch member having at least a first end portion that is substantially outboard from the longitudinal axis and a second end portion attached to the trunk member, and a plurality of mechanical linkages, each mechanical linkage having a first respective end and a second respective end, wherein:

each of the mechanical linkages includes a spring-like coupling that provides substantial resistance to both compression and tension;
the first respective end of each mechanical linkage is detachably coupled with a first respective spacecraft;
the second respective end of at least one of the mechanical linkages is attached to one of the plurality of branch members or the trunk member; and
each deploying includes detaching one of the first spacecraft or the second spacecraft from respective mechanical linkages and one of:
(A) aligning the longitudinal axis in an orientation with respect to an orbital velocity vector, the orientation being transverse to the orbital velocity vector; detaching the at least one spacecraft from respective mechanical linkages; and rotating the structural arrangement about the longitudinal axis or translating the structural arrangement by imparting an impulse directed substantially parallel to the orbital velocity vector; or
(B) aligning the longitudinal axis in an orientation with respect to an orbital velocity vector, the orientation being parallel to the orbital velocity vector; detaching the at least one spacecraft from respective mechanical linkages; and rotating the structural arrangement about an axis transverse to the longitudinal axis or translating the structural arrangement by imparting an impulse directed substantially parallel to the orbital velocity vector.

11. The method of claim 10, wherein each spacecraft is coupled directly only with one or both of at least one of the branch members and the trunk member of the tree-like structural arrangement and not with another spacecraft.

12. The method of claim 10, wherein, when the at least one spacecraft is detached, the respective mechanical linkages are configured to retract toward respective branch members to which they are attached.

13. The method of claim 10, wherein the orientation is transverse to the orbital velocity vector.

14. The method of claim 13, wherein the rotating comprises rotating the structural arrangement about the longitudinal axis.

15. The method of claim 13, wherein the translating comprises imparting an impulse directed substantially parallel to the orbital velocity vector.

16. The method of claim 10, wherein the orientation is parallel to the orbital velocity vector.

17. The method of claim 16, wherein the rotating comprises rotating the structural arrangement about an axis transverse to the longitudinal axis.

18. The method of claim 16, wherein the translating comprises, after detaching the at least one spacecraft, imparting an impulse directed substantially parallel to the orbital velocity vector.

* * * * *